Figure 1:
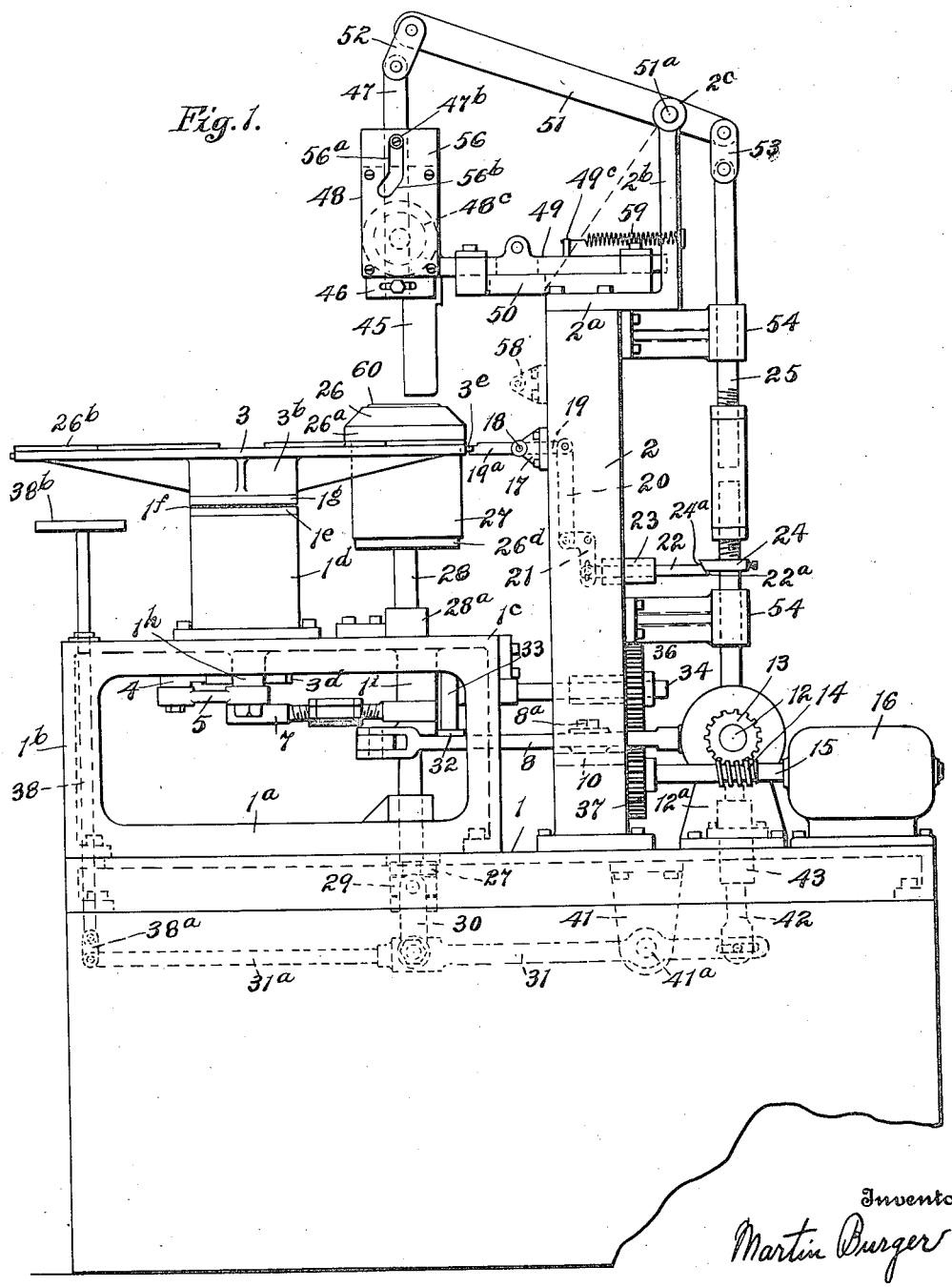

Oct. 2, 1923.

M. BURGER 1,469,378

POTTERY FORMING MACHINE

Filed Feb. 20, 1922       8 Sheets-Sheet 1

Inventor
Martin Burger

By
Fred C. Billman  Attorney

Oct. 2, 1923.
M. BURGER
POTTERY FORMING MACHINE
Filed Feb. 20, 1922
1,469,378
8 Sheets-Sheet 2
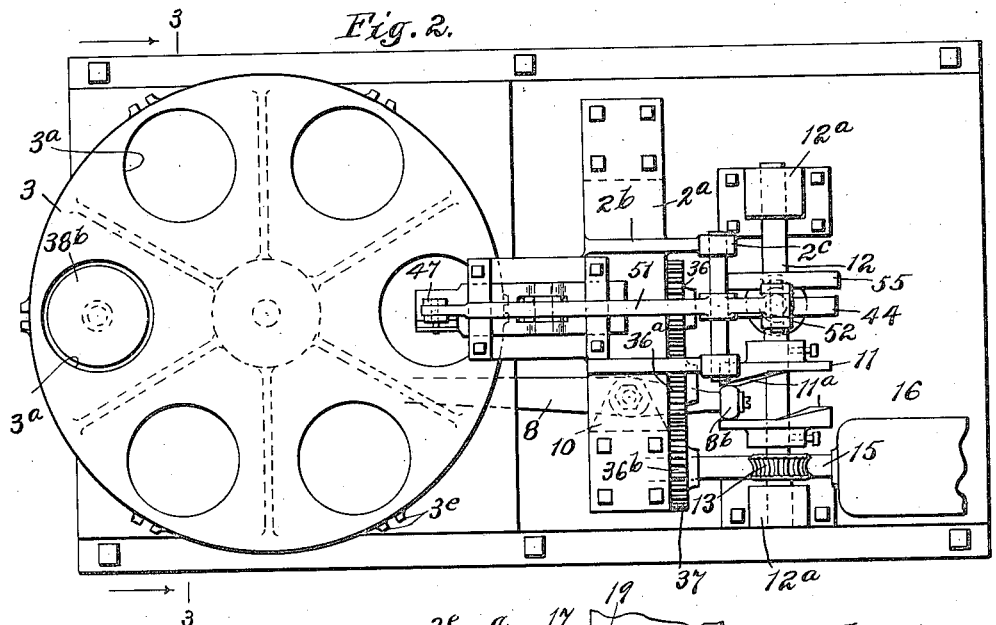
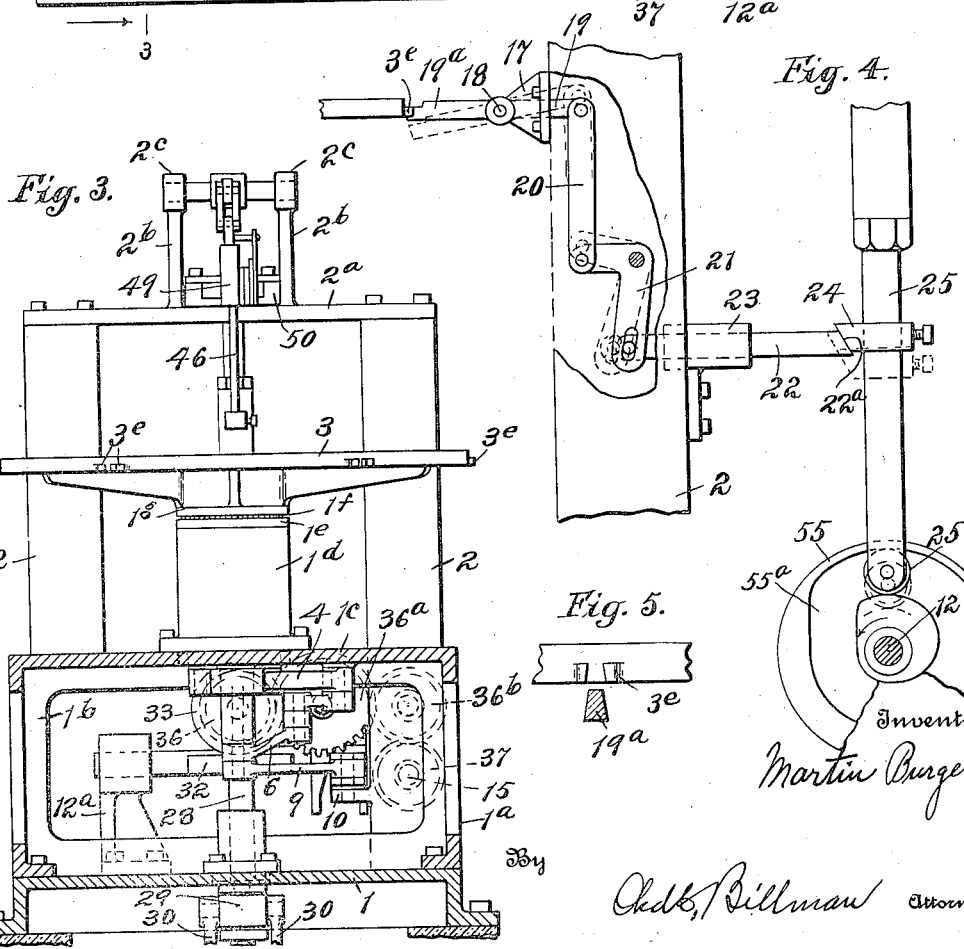

Oct. 2, 1923.
M. BURGER
POTTERY FORMING MACHINE
Filed Feb. 20, 1922
1,469,378
8 Sheets-Sheet 3
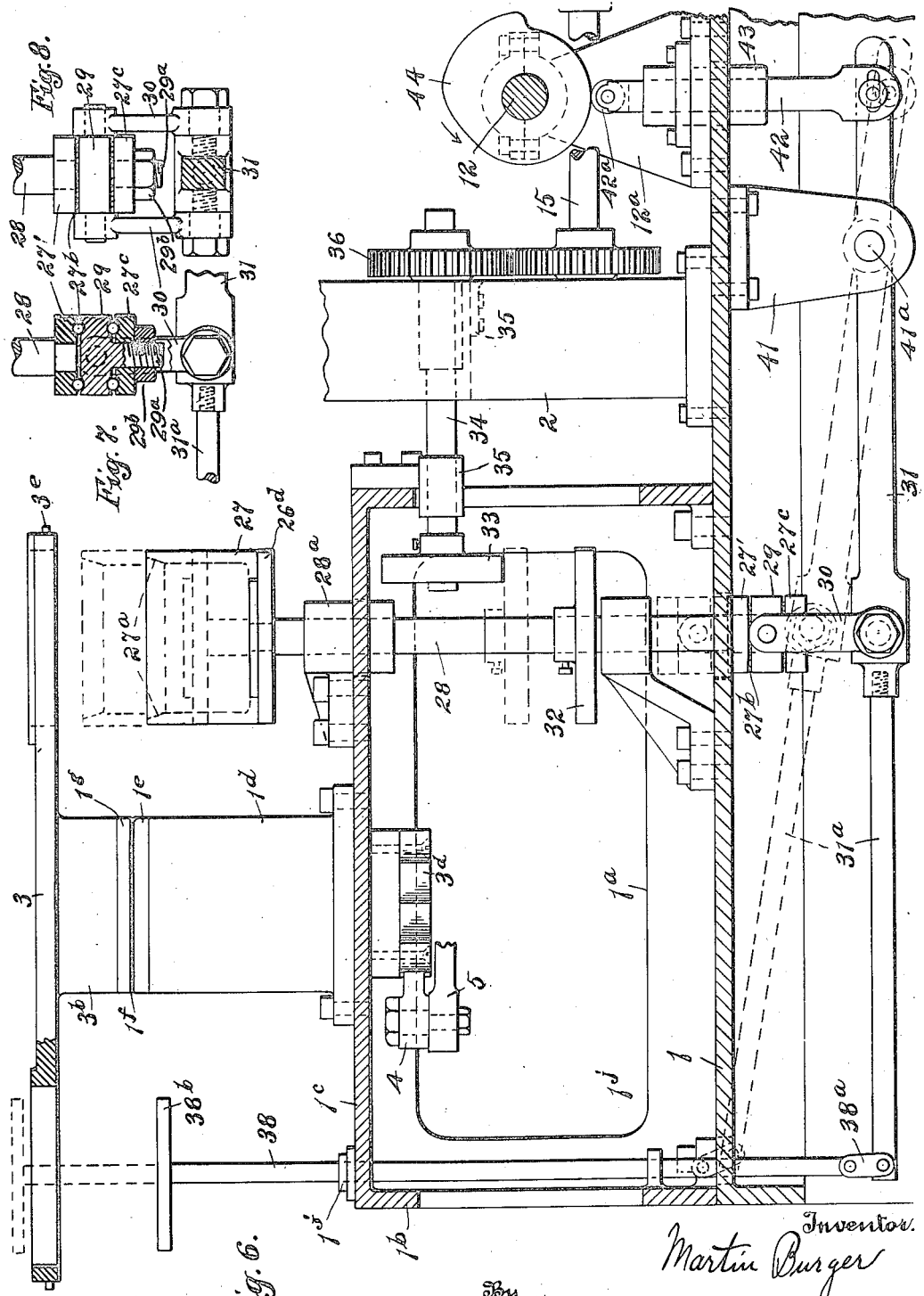
Inventor.
Martin Burger
By
Fred B. Billman Attorney Oct. 2, 1923.
M. BURGER
POTTERY FORMING MACHINE
Filed Feb. 20, 1922
1,469,378
8 Sheets-Sheet 4
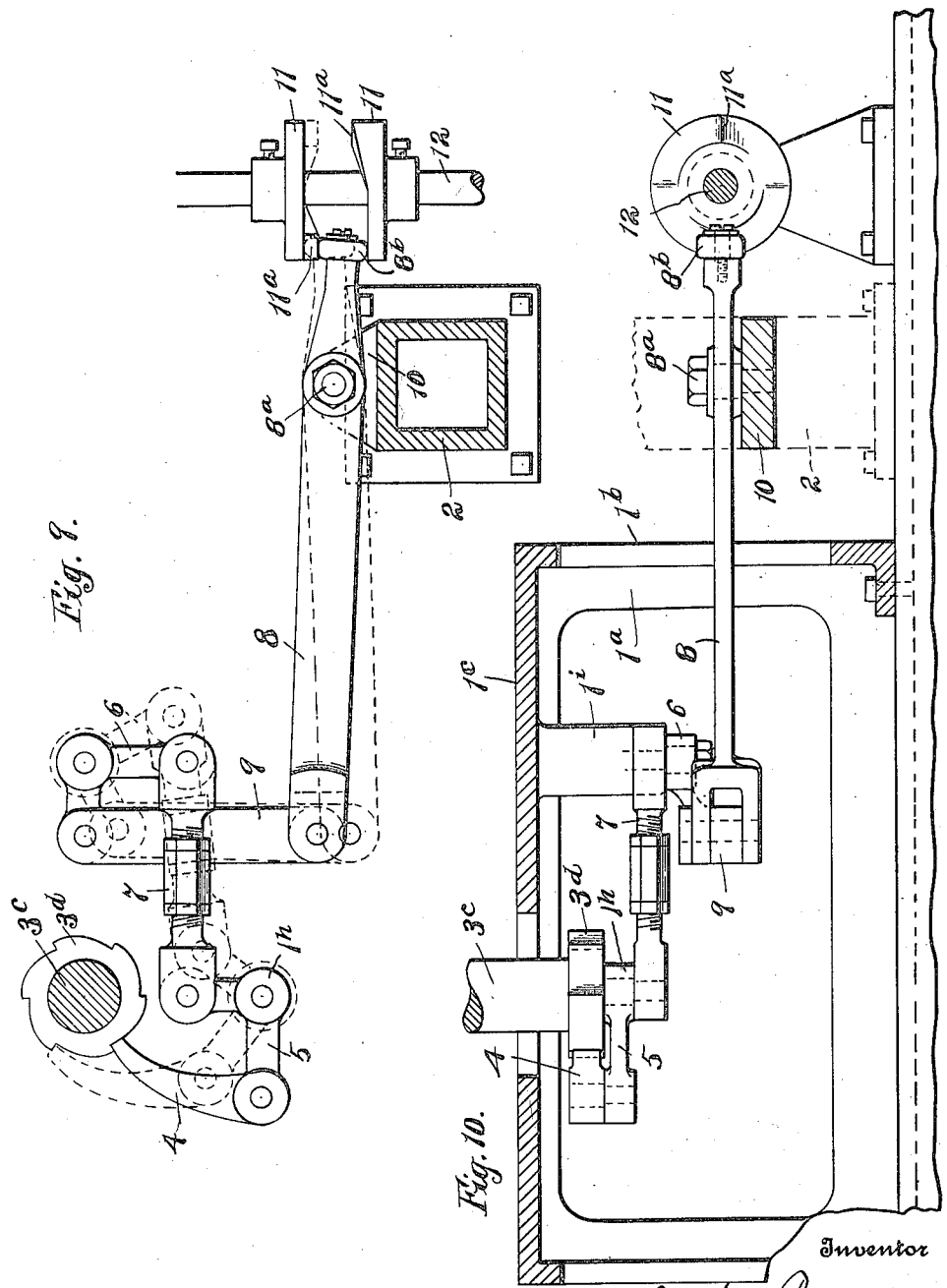
Inventor
Martin Burger
By
Ord E Billman Attorney Oct. 2, 1923.
M. BURGER
1,469,378
POTTERY FORMING MACHINE
Filed Feb. 20, 1922
8 Sheets-Sheet 5
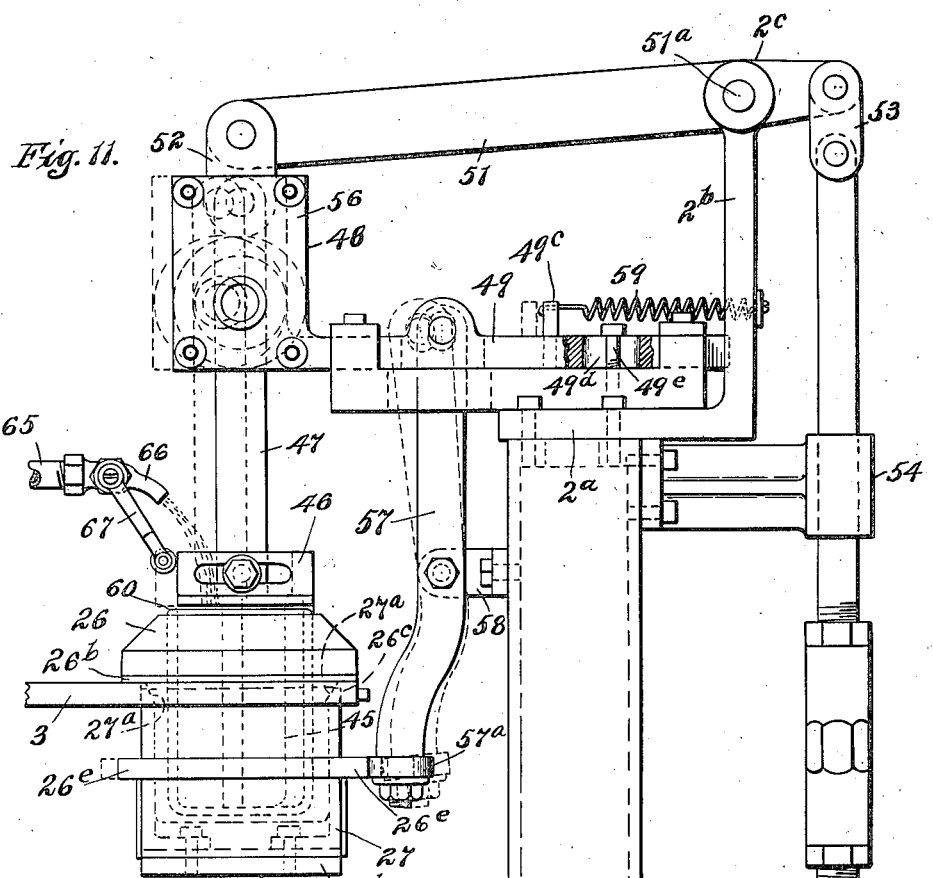
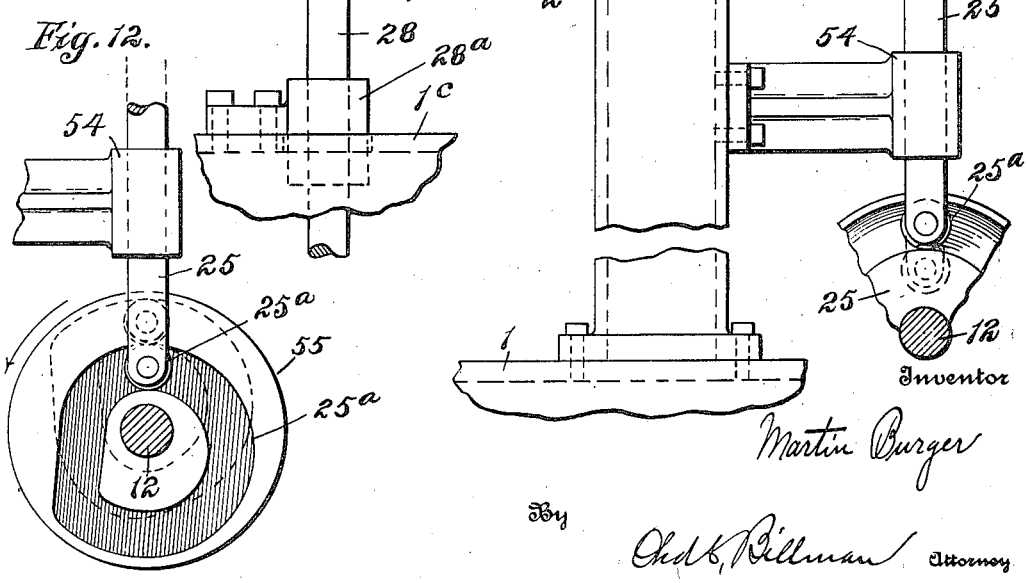
Inventor
Martin Burger
By Chd K Billman Attorney

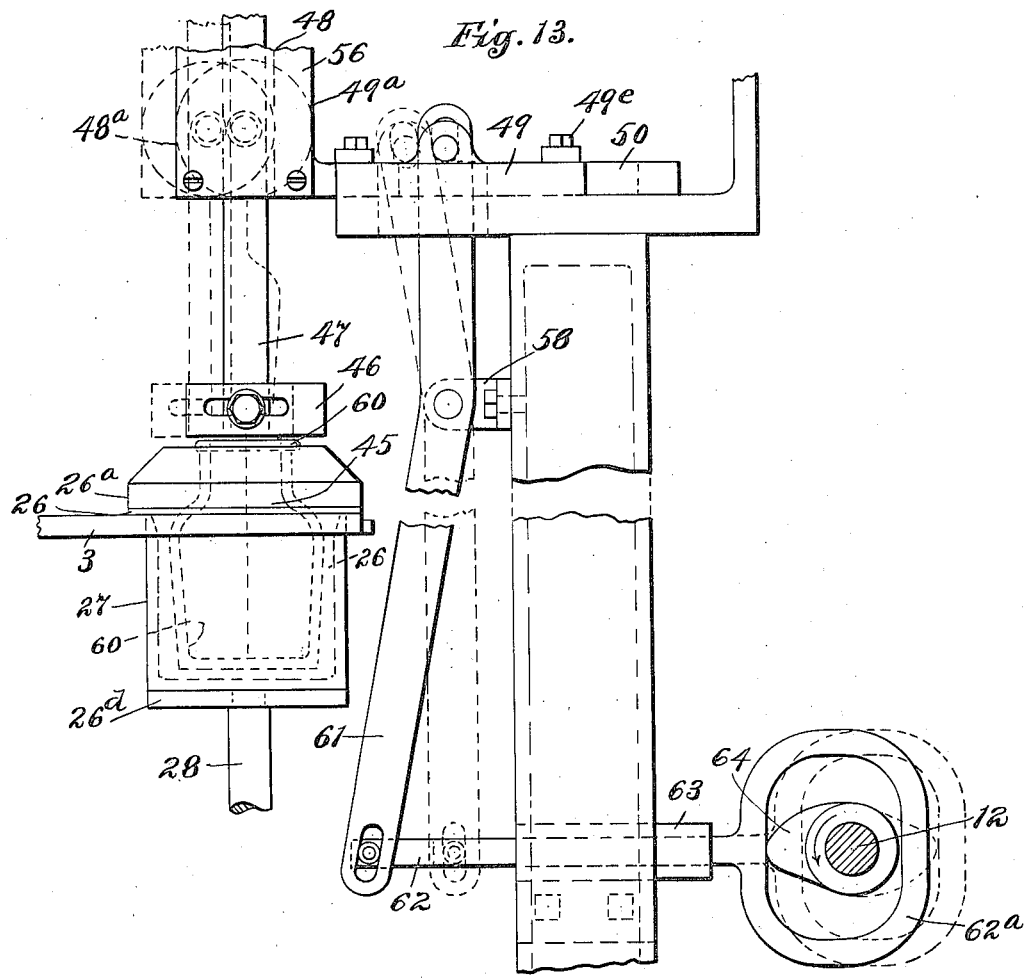

Oct. 2, 1923.
M. BURGER
POTTERY FORMING MACHINE
Filed Feb. 20, 1922
1,469,378
8 Sheets-Sheet 7
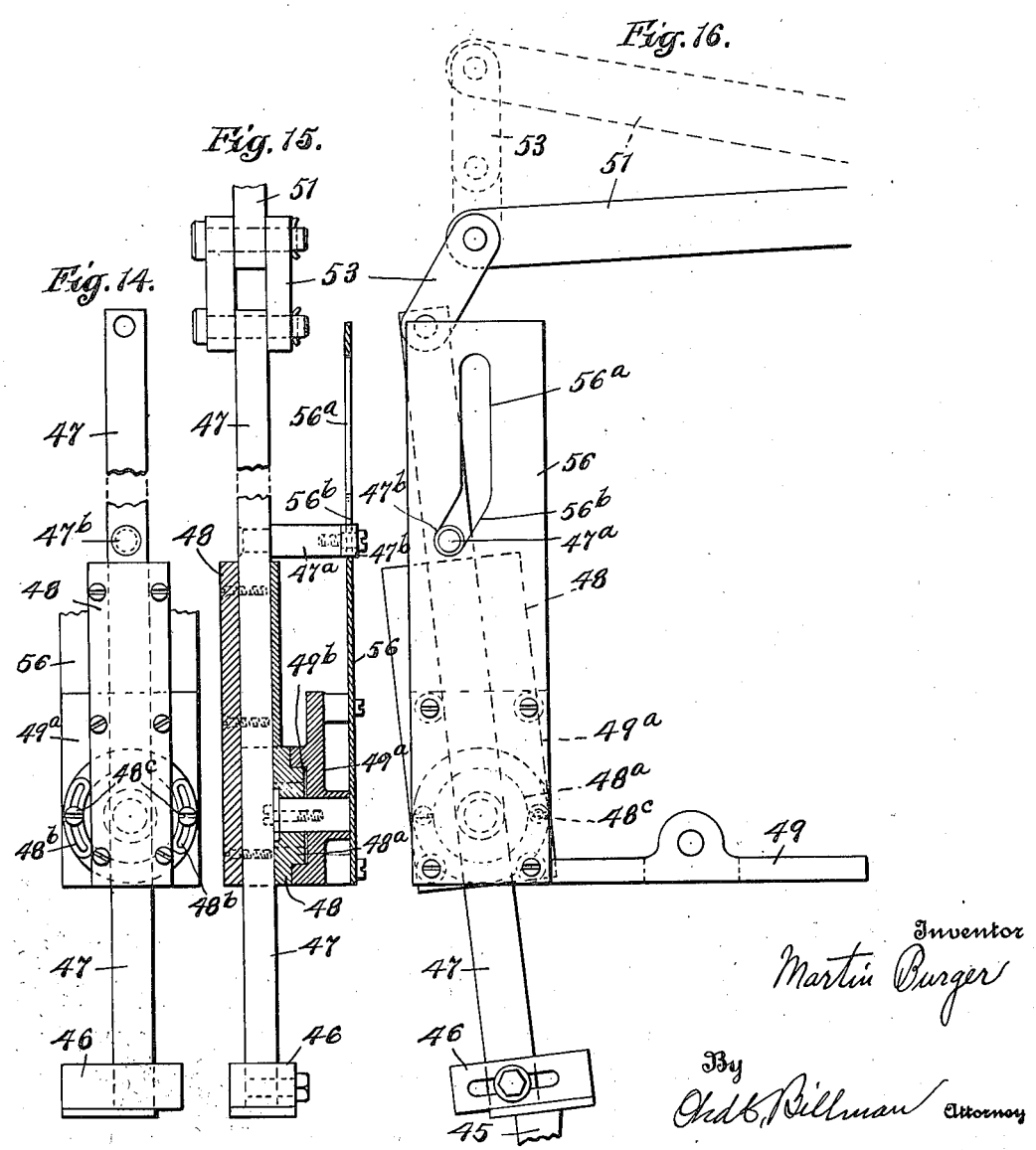

Oct. 2, 1923.

M. BURGER

POTTERY FORMING MACHINE

Filed Feb. 20, 1922  8 Sheets-Sheet 8

1,469,378

Inventor
Martin Burger
By
Fred K. Billman, Attorney

Patented Oct. 2, 1923.

1,469,378

UNITED STATES PATENT OFFICE.

MARTIN BURGER, OF CLEVELAND, OHIO, ASSIGNOR OF ONE-HALF TO GAETANO E. ROMANO, OF CLEVELAND, OHIO.

POTTERY-FORMING MACHINE.

Application filed February 20, 1922. Serial No. 537,944.

*To all whom it may concern:*

Be it known that I, MARTIN BURGER, a citizen of the United States, residing at Cleveland, in the county of Cuyahoga and State of Ohio, have invented certain new and useful Improvements in Pottery-Forming Machines, of which the following is a specification.

My invention relates to improvements in pottery forming machines, the present embodiment of the invention being particularly designed and adapted for forming articles, such for instance, as cups, saucers, plates, etc., from plastic clay preparatory to the final drying and burning thereof.

The primary object of the invention is to provide a generally improved machine of the class or type indicated which will be exceedingly simple in construction, cheap of manufacture and efficient in use.

A further and very important object is the provision of a machine of this class which will be entirely automatic in operation embodying an improved horizontally movable rotatably mounted mold carrier or table arranged to be intermittently rotated to bring the various molds successively into operative position with respect to the forming tool which is designed to fashion the article from plastic material in each mold as the latter is brought into proper relative position, together with improved means for automatically and successively engaging each mold and supporting and actuating such mold in co-operative relation to the former tool when the mold carrier or table is at rest, thereby supporting and actuating each mold in such position independently of the mold carrier table thereby relieving the latter of all strains and stresses incident thereto.

A still further object is the provision of automatically actuated means for successively engaging and ejecting each mold and the contained formed article from the delivery side of the mold carrier in convenient relation to be engaged and removed by a suitable mold conveyer.

A still further object is the provision of improved former guiding and actuating mechanism adapted to successively enter each mold when the mold carrier is at rest and to automatically return from the mold upon the completion of the forming operation and prior to the actuation of the mold carrier or table for bringing the next mold into co-operative relation therewith.

A still further object is the provision of an improved former tool actuating and adjusting mechanism whereby the former tool may be readily adjusted and regulated to conform to the form and contour of the particular article being formed.

With the above mentioned and other ends in view, the invention consists in the novel construction, arrangement and combination of parts, hereinafter described, illustrated in some of its embodiments in the accompanying drawings, and particularly pointed out in the appended claims.

Referring to the drawings, forming a part of this specification, Figure 1 is a side elevation of a machine constructed in accordance with this invention, the mold carrier being at rest and the mold and former actuating mechanism being in initial position preparatory to moving into co-operative mold actuating and forming relation to the mold and mold charge, respectively.

Fig. 2, a top plan view of the same.

Fig. 3, a front elevation, partly in section, taken on line 3—3 of Fig. 2.

Fig. 4, a fragmentary side elevation of the mold carrier locking mechanism for locking and releasing the mold carrier or table at predetermined or rest positions preparatory to actuating the mold and forming the mold charge carried thereby by the mold actuating and former mechanism.

Fig. 5, a fragmentary detailed view of the stop and lock members of the mold carrier locking mechanism.

Fig. 6, an enlarged longitudinal sectional view, partly in side elevation, the dotted lines indicating the operative positions of the mold actuating and mold ejecting mechanism.

Fig. 7, a detailed sectional view of the lower bearing portion of the reciprocatory mold engaging and actuating shaft.

Fig. 8, a front elevation of the same.

Fig. 9, an enlarged top plan view of the actuating or driving mechanism for intermittently driving the mold carrier or table.

Fig. 10, a side elevation of the same.

Fig. 11, an enlarged side elevation of the reciprocatory former mechanism in co-operative or working position with a mold and mold charge, the mold and reciprocatory former carriage being provided with means for reciprocating the carriage to carry and conform the former tool to an oblong or irregularly shaped mold for the formation of a correspondingly shaped article.

Fig. 12, an enlarged side elevation of the former tool actuating cam and plunger.

Fig. 13, an enlarged fragmentary side elevation of a former tool attachment for automatically reciprocating the former tool carriage and former tool for undercutting and forming irregular shaped articles in plastic material.

Fig. 14, an enlarged side elevation of the reciprocatory former tool carrying actuating and guiding mechanism, detached.

Fig. 15, a front elevation of the same, partly in central vertical section.

Fig. 16, a side elevation of the same, the former carrying plunger being held in a laterally inclined down or operative position for correspondingly forming inclined walls or surfaces in the article to be formed.

Figure 17:
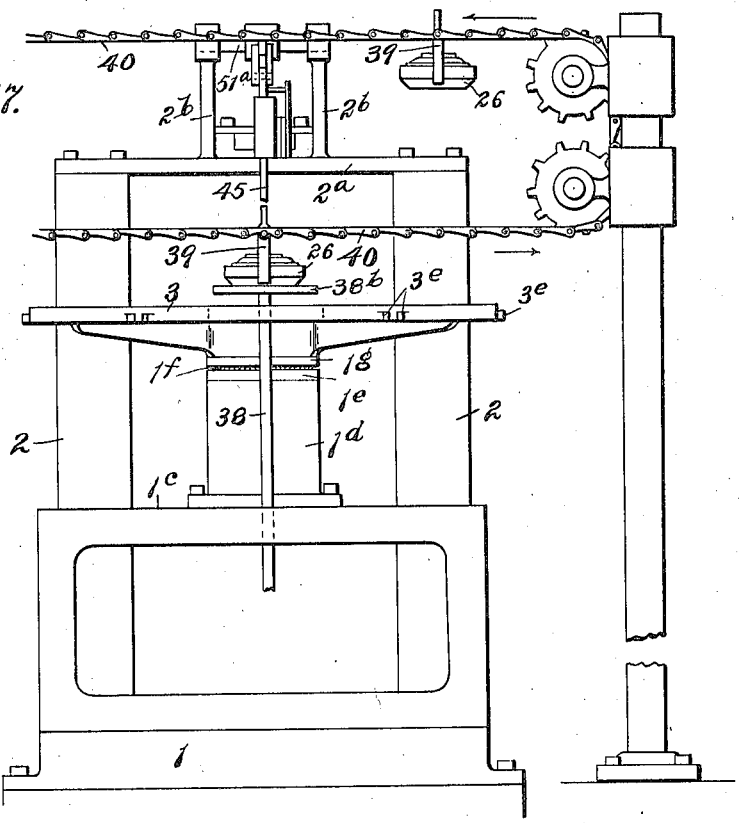

Fig. 17, a side elevation of the delivery side of the machine, illustrating a mold carrier device for receiving and removing the forming mold and contained formed article from the mold ejecting mechanism.

Figure 18:
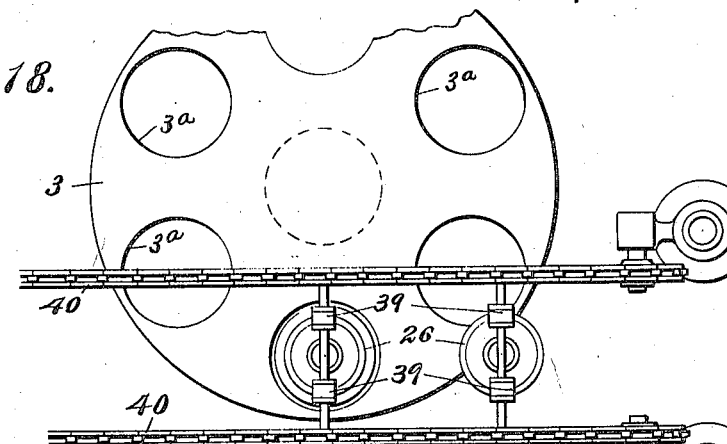

Fig. 18, a top plan view of the same.

Similar numerals of reference designate like parts throughout all the figures of the drawings.

The improved machine comprises a suitable supporting frame made up, in the present instance, of a suitable supporting base or bed 1, provided with side and cross frame members 1$^a$ and 1$^b$, surmounted by a supporting top 1$^c$. The frame members 1$^a$ to 1$^c$, inclusive, are adapted to carry and support the various working parts and bearings therefor, as hereinafter referred to.

The supporting base or bed 1, in the present instance, is provided with a standard or pedestal 2, made up of spaced columns and surmounted by the supporting bracket 2$^a$, having upwardly extending arms 2$^b$, terminating in bearing heads 2$^c$.

As a means of properly supporting and feeding the molds whereby the latter may be brought successively into proper position to be operated upon by the former tool and the subjacent mold engaging supporting and actuating device, as hereinafter referred to, and whereby also molds at the delivery side of the machine or mold carrier may be ejected to be engaged and carried away by suitable conveyor mechanism, a mold carrier 3 is provided, said mold carrier, in the present instance, being in the specific form of a rotatably mounted table provided about its periphery with a plurality of equally spaced mold receiving openings 3$^a$, said openings 3$^a$, being adapted to receive the subjacent mold driving and ejecting members when the latter are in their elevated positions, as shown most clearly in Fig. 6 of the drawings.

As a means of supporting the carrier or table 3 upon the frame, the supporting top table 3 may be provided with a cylindrical support 1$^c$ or column 1$^d$, provided at its top with a suitable ball bearing annular race way 1$^e$, in which ball bearings 1$^f$ may be mounted to co-operate with a suitable annular race way 1$^g$, on the lower side of the supporting head 3$^b$, of the mold carrier or table 3.

As a means of intermittently actuating or driving the carrier 3 within the supporting column 1$^d$ and upon the bearings referred to, the head 3$^b$ of the carrier 3 is provided with a driving or actuating shaft 3$^c$, extending downwardly through the top 1$^c$ and provided at its lower end with a ratchet wheel 3$^d$, the teeth of said ratchet wheel 3$^d$ being adapted to be successively engaged by means of a pawl 4, carried upon one end of a bell crank 5 (see Fig. 9), the latter being mounted on a bearing 1$^h$, extending, in the present instance, downwardly from the supporting top 1$^c$, said bell crank 5 being connected to a second bell crank 6 by means of a link 7, and the second bell crank 6 being mounted on a second bearing 1$^i$, on the bed plate 1$^c$, said second bell crank 6 being connected to an actuating lever 8, by means of a connecting link 9. The horizontally movable actuating lever 8 is pivotally mounted, in the present instance, upon a bearing bracket 10, mounted on one of the standards 2, and secured by means of a bearing bolt 8$^a$, the short end of the lever 8 being provided with a friction roller 8$^b$, interposed between a pair of cam members 11, having lateral cam faces 11$^a$, the cams 11 being mounted on a transversely extending shaft 12, mounted in bearing brackets 12$^a$, on the supporting base or bed 1. As a means of driving the shaft 12, the latter is provided at one end with a worm gear 13, meshing with a worm 14, of a motor shaft 15, in a suitable motor 16. It will thus be seen that as the shaft 12 is rotated by the motor the mold carrier will be intermittently driven or rotated through the pawl 4 and connected link and bell crank mechanism, such motion during each working impulse serving to bring the succeeding mold in the mold carrier or table directly beneath the former tool and directly over the individual mold support and driving mechanism, hereinafter referred to.

As a means of locking the mold carrier or table 3 in its respective shifted positions when actuated by the intermittently actuated driving mechanism above described and unlocking such mold carrier preparatory to being given a new working or mold transferring movement, the standard or pedestal members 2 may be provided with a bearing bracket 17, provided with a bearing 18, carrying a pivoted lever or latch 19, the free end 19ª, being preferably tapered as shown in Fig. 5 and being adapted to enter between similarly tapered lugs 3ᵉ, on the outer edges of the carrier or table 3 and spaced to correspond with the mold receiving openings 3ª, said latch or lever 19 being connected to a vertically extending link 20, connected to a bell crank 21, mounted on a suitable bearing, said bell crank being connected to a horizontally extending actuating bar 22, slidably mounted in a guide or bearing bracket 23. The free end of the slidable bar 22 may be provided with an inclined or bevelled end 22ª, adapted to be engaged by and to co-operate with a similarly inclined bevelled end 24ª, of a bracket 24, mounted, in the present instance, on the reciprocatory connecting link or bar 25, for operating the former tool, hereinafter referred to.

The molds 26, provided with suitable charges of plastic material, are adapted to be removably mounted in the mold receiving openings 3ª, of the mold carrier 3, and may be of any suitable and convenient form adapted to the contour of the particular article to be formed. As a means of supporting the molds 26 on the mold carrier as moved to and from the former tool and the subjacent mold supporting and actuating mechanism, and as later transferred from the latter to the mold ejecting mechanism, hereinafter referred to, each mold is preferably provided with an overhanging annular flange 26ª, affording a shoulder adapted to rest on the table or carrier, the latter being preferably provided with a gasket 26ᵇ, to form a suitable resilient support for the shoulder of the annular flange 26ª of the mold.

As a means of independently engaging supporting and driving the mold 26 in co-operative relation with the overhanging former tool and independently of the carrier or table 3 when the latter is at rest, thereby relieving the carrier or table of any strains or stresses during such article forming operation, a vertically and circumferentially movable mold engaging supporting and actuating head 27 is provided beneath the table and in line with the path traversed by the overhanging molds, said head 27, in the present instance, being of hollow cup shape to receive the pendant portion of the mold, said hollow head 27 being preferably provided at its upper edges with inclined annular shoulder portions 27ª, adapted to engage with a similarly inclined shoulder 26ᶜ, on the molds. The base of the mold engaging and actuating head may be secured to a base plate 26ᶜ, carried upon a shaft 28, the latter operating in a guide bearing 28ª, formed, in the present instance in the base or bed 1.

The shaft 28 is provided at its lower end with a bearing head 27′, the latter, in the present instance, forming a ball race way to co-operate with suitable ball bearings 27ᵇ, the latter resting on a swivel block 29, swivelly connected at its side with bearing links 30, leading downwardly to an actuating lever 31. The swivel bearing block 29 is preferably connected to a second bearing head 27ᶜ, forming a race way for a second set of ball bearings, the second bearing head 27ᶜ, in the present instance being connected by means of a threaded extension 29ª, provided with a nut 29ᵇ.

The shaft 28 is provided with a friction wheel 32, so that when the shaft 28 and the mold engaging driving head 27 are elevated through the medium of the actuating lever 31, as hereinafter referred to, and the mold 26 has been elevated out of engagement with the carrier or gasket 26ᵇ, the friction wheel 32 will come into engagement with a second friction wheel 33, carried upon the end of a driving shaft 34, mounted in suitable bearings 35, of the machine frame, said shaft 34 being provided at its end with a gear wheel 36, meshing with an idle gear 36ª, and the latter meshing with a second idle gear 36ᵇ, and the latter meshing with a gear 37, carried on the end of the motor shaft 15.

As a means of simultaneously elevating and ejecting a mold and the formed article therein from the delivery side of the mold carrier or table with the same working impulse imparted to the actuating lever 31 in elevating the shaft 28 and head 27 for supporting and actuating the mold as above described, the actuating lever 31 is provided with an extension 31ª, connected at its outer end to a vertically movable plunger 38, through the medium of links 38ª, the links 38ª being adapted to reciprocate the plunger 38 in the guide 1¹, of the machine frame simultaneously with the reciprocation of the shaft 28 and mold engaging and actuating head 27. The plunger 38 is provided at its top with a head 38ᵇ, adapted to engage with the lower portion of the mold and raise the same upwardly out of the mold receiving opening 3ª, as shown in Fig 17 of the drawings whereby the same may be readily engaged by jaws 39, on an endless conveyer 40 suitably mounted and since such conveyer forms no specific part of the present invention, the same need not be described in detail. In the present instance, the actuating lever 31 is pivotally mounted on a bracket 41, by means of a bearing 41ª, and the lever is adapted to be actuated through the medium of a vertically movable actuating or plunger rod 42, operating in a guide bearing bracket 43, said actuator 42 being adapted to ride upon and to be actuated by a cam 44 carried by the shaft 12. The actuator or plunger member 42 may be provided with a friction roller 42ᵃ.

The former tool 45 may be of any suitable and convenient form, and as a means of carrying, guiding and adjusting such former tool in proper co-operative relation to the subjacent charge of material in the molds and the subjacent mold engaging and actuating head 27, the former tool 45, is adjustably mounted in a tool holder 46, carried at the lower end of the plunger or guide stem 47, the latter being adapted to reciprocate within a guide head 48, carried by a carriage 49, mounted in a suitable carriage guide support or bracket 50, said carriage support 50, in the present instance, being mounted on the supporting bracket 2ᵃ of the supporting standard or pedestal 2.

As a means of reciprocating the plunger 47 and the former tool 45 carried thereby whereby the latter will enter within and be withdrawn from the mold 26 in co-operative relation to the actuation of the mold engaging and actuating head 27 and shaft 28, the upper end of the plunger or guide stem 47 is connected to a lever 51, through the medium of links 52, the lever being pivoted between the bearing heads 2ᶜ of the bracket arms 2ᵇ by means of a bearing member 51ᵃ, the rear end of the lever being connected to the vertically movable bar 25 by means of links 53, and the vertical reciprocatory bar 25 is adapted to slide within the bearing brackets 54. As a means of reciprocating the bar 25 and the connected link and lever mechanism for operating the former tool, the lower end of the bar 25 is provided with a laterally extending roller 25ᵃ, adapted to operate within a cam groove 55ᵃ, of a cam member 55, mounted on the shaft 12 in co-operative relation to the cam 44 for actuating the lever 31, said cams 44 and 55 being arranged in properly timed synchronous relation to each other.

The guide head 48, is preferably swivelled to the relatively fixed member 49ᵃ, of the carriage through the medium of lateral cylindrical head and socket members 48ᵃ and 49ᵇ, respectively, and if desired the guide head 48 may be inclined and secured in such inclined position by means of slots 48ᵇ, and adjusting screws 48ᶜ, as shown most clearly in Fig. 14 of the drawings.

As a means of carrying the stem or shank 47 to an inclined position, as in undercut or bevelled work, the fixed member 49ᵃ of the carriage may be provided with a face plate 56, having a guide slot 56ᵃ, the latter being provided with an angularly extending terminal portion 56ᵇ, adapted when the plunger 47 is moved downwardly to its lowermost position to carry the former tool laterally, as indicated most clearly in Fig. 16 of the drawings, the stem 47 in this instance being provided with a laterally extending guide member 47ᵃ, provided with a guide roller 47ᵇ, operating in the guide slot 56ᵃ in a well known and understood manner.

As a means of moving the carriage and the tool holder and guide stem carriage thereby to cause the tool holder 46 to automatically move and conform to the interior of an oblong or irregularly shaped article, as in Fig. 11 of the drawings, the carriage may be moved in one direction by means of an attachment such as shown in Fig. 11 consisting, in the present instance, of a lever 57, mounted on a bracket 58, on the standards 2, said lever being connected at one end to the carriage and the other being provided with a roller 57ᵃ, adapted to be actuated by suitably shaped guide or contour plate 26ᵉ, the contour plate 26ᵉ being shaped to reciprocate the carriage 49 and the former tool 45 so that the latter will follow the contour of the mold cavity or article being formed in oblong or irregular shape. The lever 57 acts to move the carriage in one direction against the resistance of a spring 59, connected to a lug 49ᶜ, on the carriage 49, and connected at the opposite end to the bracket arms 2ᵇ and as a means of limiting the reciprocatory movements imparted to the carriage 49, the latter is provided with a slot 49ᵈ, operating in co-operative relation to a stop bolt 49ᵉ.

Referring to the form or attachment shown in Fig. 13 for automatically moving the former tool 45 just after the insertion of the latter into the mold cavity for forming an article 60, having a contracted neck portion and an enlarged body portion and for retracting or centralizing such former tool prior to the elevation or retraction of the latter from the neck of the article or vessel 60, it will be seen that a lever 61, is mounted in the bracket 58, and that the lower end of the lever 61 is connected to a horizontally movable rod 62, mounted in a guide bracket 63, the rod or bar 62 terminating in a loop head 62ᵃ, having its opposite sides adapted to be alternately engaged by a cam 64, mounted on the transverse shaft 12.

Referring to the use of a face plate 56, having a guide slot 56ᵃ, and terminal slot portion 56ᵇ, as shown for example in Figs. 1 and 16 of the drawings, for causing the plunger stem 47 and the former tool 45 carried thereby to be inclined laterally at the end of the downward stroke or the working position of the tool within the plastic charge in the molds, it should be understood that when such form of slotted face plate is used the screws 48ᶜ (see Fig. 14) are loosened in the segmental slots 48ᵇ to permit of this tilting or lateral movement of the relatively movable guide head 48 within the bearing socket 49ᵇ of the relatively fixed member 49ᵃ of the carriage. In forming the various articles 60 from plastic material within the molds, a suitable conduit pipe 65, may be provided, said pipe 65, leading to a suitable supply of water or other lubricant and being provided with a nozzle 66, controlled by a handle 67, operating a suitable valve, the said nozzle 66 being adapted to discharge into the mold receptacle or upon the plastic material, as indicated for example in Fig. 11 of the drawings.

Having thus described some of the embodiments of my invention, without having attempted to set forth all the forms in which it may be made, or all the modes of its use, what I claim and desire to secure by Letters Patent is,—

1. In a machine for shaping plastic material, a support, a plunger, a former tool carried by said plunger, means for actuating said plunger, and means for guiding and moving said plunger and former tool laterally while being actuated by said plunger actuating mechanism.

2. In a machine for shaping plastic material, a horizontally movable rotatably mounted mold carrier table, means for intermittently actuating the latter, means for locking said carrier table in predetermined rest positions, a plunger, actuating means for said plunger, means for locking said carrier table when in predetermined rest positions, and means for moving said plunger and former tool laterally as the latter is moved downwardly to normal position between intervals of movement of said carrier table.

3. In a machine for shaping plastic material, a horizontally movable mold table carrying vertically movable molds, means for intermittently moving said table and independently elevating and rotating said molds, means for locking and unlocking said table in predetermined positions, a carriage provided with a guide head, a plunger in said guide head, a former tool on said plunger, and means for reciprocating said carriage and guide head whereby said plunger and former tool are carried laterally.

4. In a machine for shaping plastic material, a support provided with a guide head, a plunger in the latter, a former tool carried by said plunger, means for adjusting said guide head to vary the inclination of said plunger and former tool, and means for actuating said plunger.

5. In a shaping machine for plastic material, a rotatably mounted horizontally movable table carrying vertically movable molds, means for bringing said molds to predetermined positions through intermittent movements of said table, means for successively elevating and rotating said molds independently of said table, a plunger carrying a former tool in cooperative relation to said molds, and means for carrying said former tool laterally in its working positions.

6. In a machine for shaping plastic material, a carriage support, a carriage movable therein and provided with a relatively fixed head, a relatively movable guide head thereon, a plunger in said guide head, a former tool on said plunger, and means for reciprocating said carriage whereby said plunger and former tool are carried laterally.

7. In a machine for shaping plastic material, a support, a carriage movable relatively of said support, a guide head carried by said carriage, a plunger movable in said guide head, a former tool adjustable on said plunger, means for reciprocating said plunger, and means for carrying said former tool laterally in its working position.

8. In a machine for shaping plastic material, in combination with a horizontal carrier table provided with vertically movable molds, normally supported thereon, means for intermittently rotating said table and molds to predetermined positions, automatically operated former tool mechanism operating between intervals of movement of said carrier table, means for successively elevating and rotating said molds in and independently of said table when the latter is at rest, and means for elevating said molds with the finished articles at another position of said table when the latter is at rest.

9. In a machine for shaping plastic material, a carriage support, a relatively movable carriage provided with a head, a relatively movable guide head, means for adjusting the latter, a plunger in said guide head, a former tool on said plunger, and means for moving said carriage and said plunger and former tool laterally when in working position.

10. In a machine for shaping plastic material, an intermittently moving carrier provided with loosely mounted molds capable of vertical movement therein, and intermittently operating molds engaging and rotating mechanism adapted to initially elevate and then rotate said molds successively independently of said table when the latter is at rest.

11. In a shaping machine for plastic material, a rotatably mounted horizontally movable table carrying vertically movable loosely mounted molds, means for bringing the latter to predetermined positions through the movements of said table, and means for successively engaging and rotating said molds independently of said table when the latter is at rest.

12. In a machine for shaping plastic material, in combinaiton with a horizontally movable carrier table provided with vertically movable regularly spaced molds, means for rotating said table intermittently to bring said molds to predetermined positions, and means for successively engaging and rotating said molds independently of said table when the latter is at rest.

13. In a machine for shaping plastic material, a support, a carriage movable in said support, a guide head carried by and adjustable on said carriage, a plunger vertically movable in said guide head, a former tool carried by said plunger, means for reciprocating said plunger and former tool, and means for carrying said plunger and former tool laterally in operative or down position.

14. In an automatic machine for shaping plastic material, a rotatably mounted horizontal mold carrier provided with vertically movable molds, mold rotating and ejecting members below the path of travel of said molds, means for elevating said mold rotating and ejecting members, and means for rotating said mold rotating member when in engagement with a mold whereby the latter is actuated independently of said table.

15. In a machine for shaping plastic material, the combination with a series of traveling molds, and means for intermittently moving the latter; of a reciprocatory former overhanging the path of travel of said series of molds, means for bringing said former into said molds when the latter are at rest, means for successively supporting said molds while said former is operating upon the plastic material therein, and means for ejecting said molds when the articles are finished.

16. In a molding machine, the combination with a horizontally rotating mold carrier provided with molds, and means for intermittently moving said carrier; of reciprocatory former and mold actuating devices arranged above and below the paths traversed by said molds, and means for simultaneously actuating said former and mold actuating devices when said carrier is at rest in co-operative relation to said carrier actuating mechanism.

17. In an automatic machine for shaping plastic material, a rotatably mounted mold carrier provided with removably mounted molds arranged in a circular path, mold rotating and ejecting members below said table and the path of travel of said molds, means for elevating said mold rotating and ejecting members on opposite sides of said table, and means for rotating said mold rotating member when in its elevated position whereby said engaged and rotated mold is supported independently of said table.

18. In a machine for shaping plastic material, in combination with a rotatably mounted mold for an irregular shaped article and a similarly shaped contour plate carried by said mold; of a carriage provided with a guide head, a plunger provided with a former tool, means for moving said plunger and former tool to and from said mold, and means between said carriage and contour plate for moving said carriage and former tool laterally to conform to the contour of the mold and the article to be formed therein.

19. In an automatic machine for shaping plastic material, a frame, a horizontal mold carrier on said frame provided with circularly arranged molds, a former tool and actuating mechanism on said frame, means for intermittently rotating said mold carrier, means for reciprocating the former tool during the periods of rest of the mold carrier, means for freeing the molds and completed articles from the carrier, and means for revolving the mold and charge of plastic material independently of the mold carrier when the latter is at rest.

20. In an automatic machine for shaping plastic material, a frame, a mold carrier table rotatably mounted on said frame and provided with a series of circularly arranged molds, a former mounted to reciprocate in said frame, means for intermittently rotating the mold carrier table, means for reciprocating the former during the periods of rest of the mold carrier, means for freeing the molds and completed articles from the carrier, and means for supporting the mold and charge of plastic material independently of the table when the latter is at rest.

21. In a machine for shaping plastic material, in combination with a rotatably mounted mold for an irregularly shaped article and a contour plate on the outer side of said mold; of a carriage provided with a guide head, a plunger in the latter provided with a former tool, means for moving said plunger to carry said former tool in proper relative position within the mold receptacle, and means between said carriage and contour plate for guiding said carriage to carry said former tool laterally to conform to the contour of the mold receptacle and the article being formed.

22. In an automatic machine for shaping plastic material, the combination with a rotatably mounted mold carrier carrying a series of vertically movable molds, a reciprocatory former positioned above the path of said molds, means for shifting said mold carrier intermittently to successively bring the molds thereof into operative relation to said reciprocatory former, means for successively elevating and rotating said molds independently of said carrier when the material therein is operated upon by said former, and means for guiding said former laterally to conform to the contour of the article to be formed.

23. In an automatic machine for shaping plastic material, a rotatably mounted horizontally movable carrier provided with a plurality of molds adapted to be moved relatively independently of said carrier; of former tool and mold supporting and rotating mechanism arranged above and below the paths traversed by said molds, means for intermittently moving said carrier and bringing said molds successively between the said former tool and mold supporting and actuating mechanism, and means for bringing said former tool and mold supporting and actuating mechanism into operative relation to each other and to said molds when said carrier is at rest.

24. In an automatic machine for shaping plastic material, the combination with a rotatably mounted mold carrier carrying a series of vertically movable molds, a reciprocatory former positioned above the path of said molds, means for shifting said mold carrier intermittently to successively bring the molds thereof into operative relation to said reciprocatory former, means for successively elevating said molds and supporting the same independently of said carrier when the plastic material therein is being operated upon by said former, and means for guiding said former to conform to the contour of the mold cavity and the article being formed therein.

25. In a molding machine, the combination with an intermittently actuated horizontally movable mold carrier table carrying a plurality of vertically movable molds; of an overhanging former tool and a subjacent mold supporting and actuating member arranged above and below said carrier table, means for bringing said tool and mold supporting and actuating members into engagement with said molds as the latter are successively moved into position by said mold carrier table, means for rotating said mold engaging head and said mold independently of said carrier table when the latter is at rest, and means for guiding said former tool within said mold as the latter is rotated.

26. In a machine for shaping plastic material, the combination with an intermittently actuated mold carrier provided with independently mounted molds arranged in a circular path, and means beneath said table for engaging and rotating said molds successively when said table is at rest; of an overhanging carriage provided with a guide head, a vertically movable plunger in said guide head provided with a former tool, means for actuating said plunger and carrying said former tool into said mold when the table is at rest, and means for moving said plunger and former tool laterally when the latter is in an operative position within said mold.

27. In a molding machine, the combination with a rotatably mounted carrier table provided with a plurality of vertically movable molds arranged in a circular path, and means for intermittently rotating said table to bring said molds to predetermined positions; of oppositely arranged former tool and mold supporting and rotating members arranged to be brought into operative relation to said molds when said table is at rest, means for actuating said former tool and mold rotating members, and means for carrying said former tool laterally within the mold as the latter is rotated whereby to follow the outline of an irregular shaped article being formed in said mold.

28. In an automatic machine for shaping plastic material, a frame, a mold carrier rotatably mounted for movement in a horizontal plane on said frame and provided with a series of equally spaced circumferentially arranged molds vertically and removably mounted therein, a reciprocatory overhanging former above the path of said molds, means for intermittently rotating said mold carrier to bring said molds successively under said reciprocatory former, means for independently supporting said molds and rotating the same as the plastic material therein is operated upon by said former, and means for simultaneously ejecting molds carrying the finished formed product when said mold carrier is at rest.

29. In a molding machine for plastic material, a rotatably mounted horizontally movable mold carrier, a reciprocatory vertically movable former arranged above and at right angles to the plane of said mold carrier, means for shifting said mold carrier horizontally and intermittently to successively bring the molds thereof into operative relation to said reciprocatory former, means for locking the mold carrier against movement during the periods of rest, means for supporting said molds independently of said carrier and for rotating the same in co-operative relation to said former, means for simultaneously elevating another mold with a finished article from said carrier, and means for intermittently actuating said mold carrier.

In testimony whereof I hereby affix my signature.

MARTIN BURGER.